(No Model.)

J. A. BROWN.
AUTOMATIC WATERING TROUGH.

No. 478,397. Patented July 5, 1892.

Witnesses:
C. C. Burdine
D. B. Owens

Inventor
James A. Brown
per Jno. G. Manahan
Attorney

UNITED STATES PATENT OFFICE.

JAMES A. BROWN, OF SUBLETTE, ILLINOIS.

AUTOMATIC WATERING-TROUGH.

SPECIFICATION forming part of Letters Patent No. 478,397, dated July 5, 1892.

Application filed September 21, 1891. Serial No. 406,326. (No model.)

*To all whom it may concern:*

Be it known that I, JAMES A. BROWN, a citizen of the United States, residing at Sublette, in the county of Lee and State of Illinois, have invented certain new and useful Improvements in Automatic Watering-Troughs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to improvements in automatic water-troughs, and is more especially adapted for watering the smaller animals, such as hogs, sheep, calves, poultry, &c., which are likely to foul the water unless it is constantly renewed; but by varying the proportions it can also be used for supplying larger animals with fresh water.

My invention involves the employment of a valve actuated by a pair of levers operated through the agency of a float, by means of which levers the height of the water in the compartment from which the animals drink determines the opening or closing of the water-inlet. The mechanism for intermitting the flow of water is contained in a closed chamber, so as not to be exposed to interference from the animals or other disturbing elements.

My invention is intended as supplementary to a larger water-reservoir and to draw the water from the latter in such small quantities as may be consumed, and therefore leave no considerable residuum in the trough.

Inasmuch as there is no peculiar construction to the main receptacle I do not consider it necessary to show or describe the same further than will render intelligible the attachment of my invention thereto.

My invention is illustrated in the accompanying drawings, in which—

Figure 1:
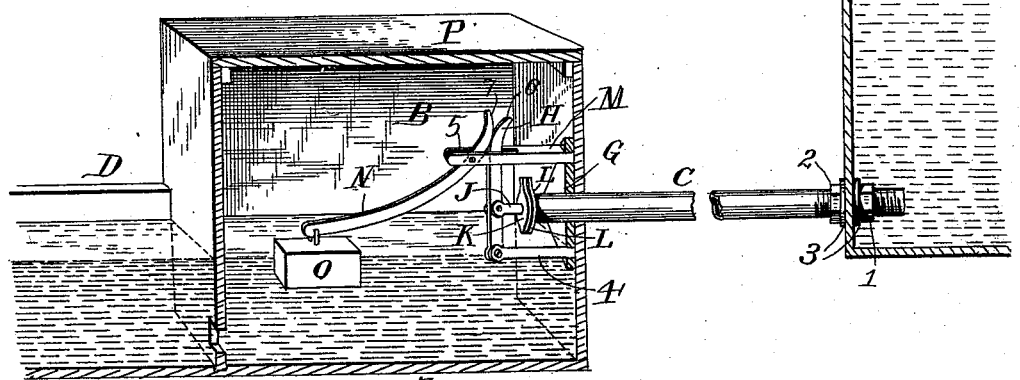
Figure 2:
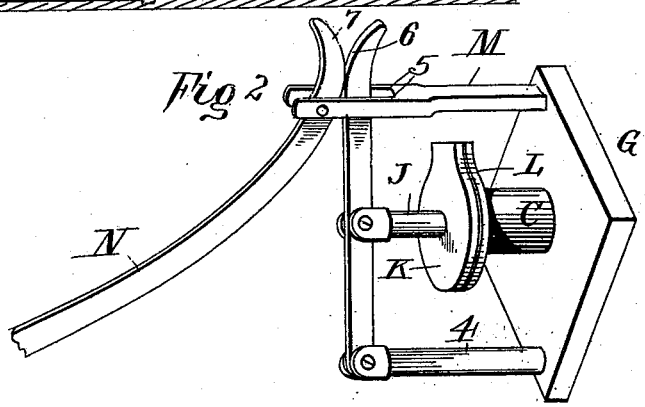
Figure 3:
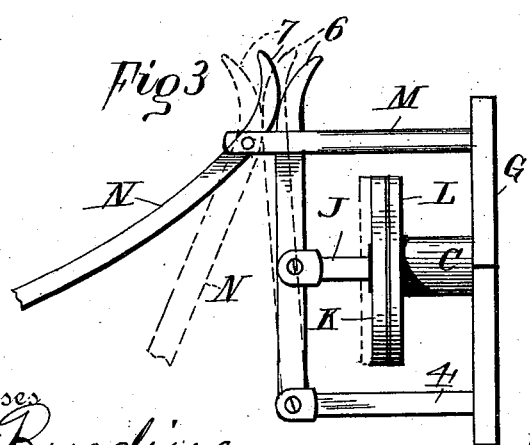

Figure 1 is a side elevation in perspective of my invention and its attachment to the main water-tank, one side of the trough and valve-chamber being partially removed to exhibit the interior thereof. Fig. 2 is a perspective of the attachment of the float-lever and valve-lever to the inlet-tube. Fig. 3 is a detail of the construction and mutual relation of the valve-lever and float-lever.

Similar letters and figures refer to similar parts throughout the several views.

A represents the adjacent side of the main water-reservoir, within which water in large quantities is either pumped or otherwise deposited.

B is the valve-chamber communicating with the reservoir A through the medium of the horizontal tube C.

D is the watering-trough, having its upper end open more or less to afford access to the water contained therein. The box B is of somewhat greater altitude than the trough D, and the two parts are separated by a partition E, having orifices F therein for the passage of water from the box B to the trough D. The parts B and D are contiguous, and, in fact, the sides thereof may be made integral.

The tube C is projected sufficiently within the reservoir A to afford means of readily seating the same in the wall thereof, and is provided with the internal nut 1 and exterior nut 2, with the washers 3 3, interposed between the respective nuts and the wall of the reservoir A. In case said reservoir is a cask having circular sides, it will be necessary to construct the washers 3 3 with beveled or slightly concave and convex sides, respectively, in order to effect the necessary sealing at the point of insertion of tube C in tank A. The tube C is projected at its other end a suitable distance within the valve-box B to afford room for the following mechanism. A plate G is seated rigidly on the inner side of the wall of the box B around pipe C, and provided with the fulcrum 4, projected horizontally into said box. The valve-lever H is fulcrumed in a vertical plane at its lower end on the fulcrum 4, and extends across the line of the tube C a short distance therefrom. Opposite the end of the tube C there is pivotally attached to the valve-lever H a short arm J, extending toward the tube C in a horizontal position and provided at its inner end with the valve K, seated on the arm J, and thereby adapted to adjust itself across the end of the tube C. Between the valve K and tube C there is interposed a leather or other flexible cushion L, to more effectually seal the outer end of the tube C, when it is desired to intermit the flow of water from the latter. Near the upper end of the plate G there is attached thereto a standard M, extending in a horizontal position into the box B. The inner end of the standard M is bifurcated to form guides 5 5, between which the lever H projects, and is thereby guided in its movements. A float-lever N is suitably fulcrumed at its upper end in the open end of the standard M, and projected obliquely downward and pivotally attached at its lower end to a float O. Lever H is provided on its inner face near its outer end with the convex or cam-like formation 6, and the outer surface of the lever N has also a cam-shaped face 7, adjacent to the cam-face 6 of lever H.

P is the lid of the box B, by which said box can be closed to protect the apparatus therein, and to exclude dirt and other impurities from the water.

The operation of my invention is as follows: The water in the trough D being nearly exhausted, a corresponding depletion takes place in the altitude of the water in the box B, and the float O, supported by the water in box B by its gravity, depresses the lower end of the lever N, thereby releasing the upper end of the lever H and the water in the tube C from the pressure of that in the tank A, then forces the lever H and valve K from the tube C, permitting the water to pass into the box B, and from it through the opening F to rise in the trough D. When the water in said trough and box have risen to any desired height, the float O is raised by the water, and the cam-face 7 of lever N pressing against the cam-face 6 of the lever H, forces the valve K against the inlet-pipe C and suspends the discharge of the water from said pipe. The purpose is to permit but a small portion of water to accumulate at any one time in the trough D, and thereby keep the water in said trough fresh and pure; and to that end the float O may be of such size, the lever N of such length, and the permitted movement of valve-lever H of such degree as to permit the water to rise in box B and trough D very slightly before valve K is seated.

The advantages of my invention are:

First, the double-lever action of the valve K is such that a small pressure from the float O will seal the tube C against a heavy pressure of water.

Second, the apparatus is simple, easy of access, and durable. The movable seat of the valve K on the lever H permits said valve to adjust itself to the end of the pipe C, regardless of the position of lever H.

Third, the automatic character of the apparatus and its certainty of operation on the least rise of the water in the trough D.

Fourth, the economy in the use of the water, as the valve K can be seated to shut off the ingress of water long before the latter can overflow the trough D.

Fifth, the intermediate chamber B preserving the cleanliness of the water and delivering the same in small quantities.

Sixth, the ability to place all of the operating mechanism above high-water level in the trough, thereby avoiding the rusting of the metal and the decay of the wooden portions of the device.

What I claim as my invention, and desire to secure by Letters Patent of the United States, is—

The combination, with a watering-trough, of a box at one end thereof provided with openings communicating with the trough, a supply-pipe projecting into the box, a plate upon the inside of the box surrounding the end of the supply-pipe, two standards in the plate, one above and one below the pipe, the inner end of the upper standard being slotted longitudinally, an oblique lever pivotally secured in the outer portion of the slotted end of the upper standard, the upper end of which lever is cam-shaped and projects above said standard and the opposite end is provided with a float, a vertical lever pivotally secured at its lower end to the lower standard and having its upper end cam-shaped and passed through the slot in the upper standard to the rear of the other lever and adapted to be engaged and operated thereby, and a valve pivotally secured to the intermediate portion of said vertical lever and engaging with the end of the supply-pipe, whereby the supply of water to be admitted to the trough may be regulated, substantially as set forth.

In testimony whereof I affix my signature in presence of two witnesses.

JAMES A. BROWN.

Witnesses:
 THOS. S. ANGIER,
 W. E. BROWN.